(12) United States Patent
O'Neil et al.

(10) Patent No.: US 9,049,285 B2
(45) Date of Patent: Jun. 2, 2015

(54) SYNCHRONIZATION OF CLIENT APPLICATION DATA BETWEEN POTS TELEPHONE AND CONTENT PORTAL THROUGH PSTN

(75) Inventors: Douglas O'Neil, Marietta, GA (US); Barbara Roden, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2131 days.

(21) Appl. No.: 11/403,465

(22) Filed: Apr. 13, 2006

(65) Prior Publication Data
US 2007/0127442 A1 Jun. 7, 2007

Related U.S. Application Data

(60) Provisional application No. 60/741,145, filed on Dec. 1, 2005.

(51) Int. Cl.
*H04L 12/66* (2006.01)
*H04M 1/2745* (2006.01)

(52) U.S. Cl.
CPC . *H04M 1/274516* (2013.01); *H04Q 2213/1309* (2013.01); *H04Q 2213/13106* (2013.01); *H04Q 2213/13109* (2013.01); *H04Q 2213/1336* (2013.01)

(58) Field of Classification Search
USPC ............... 370/352–356, 401; 379/201.01
See application file for complete search history.

(56) References Cited

U.S. PATENT DOCUMENTS

| | | | | |
|---|---|---|---|---|
| 6,810,405 B1 * | 10/2004 | LaRue et al. | ................... | 707/613 |
| 2002/0049751 A1 * | 4/2002 | Chen et al. | ........................ | 707/3 |
| 2002/0131573 A1 * | 9/2002 | Berkley et al. | ........... | 379/201.01 |
| 2002/0159574 A1 * | 10/2002 | Stogel | ........................ | 379/93.01 |
| 2004/0052356 A1 * | 3/2004 | McKinzie et al. | ........ | 379/355.02 |
| 2004/0054711 A1 * | 3/2004 | Multer | ........................ | 709/201 |
| 2005/0004992 A1 * | 1/2005 | Horstmann et al. | ........... | 709/206 |
| 2005/0032527 A1 * | 2/2005 | Sheha et al. | ................ | 455/456.1 |
| 2005/0135429 A1 * | 6/2005 | Bingham et al. | ............... | 370/503 |
| 2005/0288006 A1 * | 12/2005 | Apfel | ............................ | 455/418 |
| 2006/0018270 A1 * | 1/2006 | Forand et al. | .................. | 370/324 |
| 2006/0020804 A1 * | 1/2006 | Schleifer et al. | ............... | 713/176 |
| 2006/0026198 A1 * | 2/2006 | Emery et al. | .............. | 707/103 R |
| 2006/0072726 A1 * | 4/2006 | Klein et al. | .............. | 379/201.01 |
| 2006/0174017 A1 * | 8/2006 | Robertson | ....................... | 709/229 |
| 2006/0285663 A1 * | 12/2006 | Rathus et al. | ............... | 379/88.22 |
| 2007/0038720 A1 * | 2/2007 | Reding et al. | .................. | 709/217 |
| 2007/0058658 A1 * | 3/2007 | Ruckart | ........................ | 370/444 |
| 2007/0099671 A1 * | 5/2007 | Gruchala et al. | ............... | 455/564 |
| 2007/0133784 A1 * | 6/2007 | Jarredal | ................... | 379/355.05 |

FOREIGN PATENT DOCUMENTS

WO WO 02082319 A1 * 10/2002

* cited by examiner

*Primary Examiner* — Khaled Kassim
(74) *Attorney, Agent, or Firm* — Myers Bigel Sibley & Sajovec, PA

(57) ABSTRACT

Methods, Plain Old Telephone System (POTS) phones, and computer program products are provided for synchronizing client application data, such as names and associated telephone numbers in a phone book, between the POTS phone and a content portal through a Public Switched Telephone Network (PSTN). A dial-up data communication connection is established between the POTS phone and the content portal through the PSTN. A determination is made at the content portal that the POTS phone is associated with client application data in the portal database of the content portal. Client application data is synchronized between the POTS phone and the portal database in response to the determined association between the POTS phone and client application data in the portal database.

15 Claims, 4 Drawing Sheets

SYNCHRONIZATION OF CLIENT APPLICATION DATA BETWEEN POTS TELEPHONE AND CONTENT PORTAL THROUGH PSTN

RELATED APPLICATION

This application claims the benefit of and priority to U.S. Provisional Patent Application No. 60/741,145, filed Dec. 1, 2005, the disclosure of which is hereby incorporated herein by reference as if set forth in its entirety.

FIELD OF THE INVENTION

This invention relates to telecommunications, and more particularly to synchronization of data between applications over telecommunications networks, and associated methods and computer program products.

BACKGROUND OF THE INVENTION

Communication technology has been developed that now allows a user the freedom to make phone calls through Internet Protocol (IP) networks, cellular wireless networks, and the Public Switched Telephone Network (PSTN). Typically, a user accesses each of these networks using distinctly different communication terminals. For example, a POTS phone can be used to communicate through the PSTN, a cellular phone to communicate through cellular networks, and an IP phone to communicate through IP networks (such as the Internet). User applications on such phones have also evolved to offer increased features, including Personal Information Management (PIM) applications by which a user can establish an electronic phone book. Managing a user's information that is distributed across various different communication devices continues to present a challenge.

SUMMARY OF THE INVENTION

Methods, Plain Old Telephone System (POTS) phones, and computer program products are provided by embodiments of the present invention for synchronizing client application data, such as names and associated telephone numbers in a phone book, between a POTS phone and a content portal through a Public Switched Telephone Network (PSTN). A dial-up data communication connection is established between the POTS phone and the content portal through the PSTN. A determination is made at the content portal that the POTS phone is associated with client application data in the portal database of the content portal. Client application data is synchronized between the POTS phone and the portal database in response to the determined association.

In some further embodiments, the client application data in the content portal can be synchronized with client application data in other phones, such as other POTS phones, cellular phones, and/or IP phones.

Accordingly, a user may define/change names and associated phone number in a POTS phone and have that data communicated to the content portal via dial-up connection and, therefrom, to other phones that are associated with the user. Likewise, a user may define/change names and associated phone number in non-POTS phones and have that data communicated to the content portal and, therefrom, to a POTS phone that is associated with the user.

DETAILED DESCRIPTION OF EMBODIMENTS OF THE INVENTION

Figure 1:
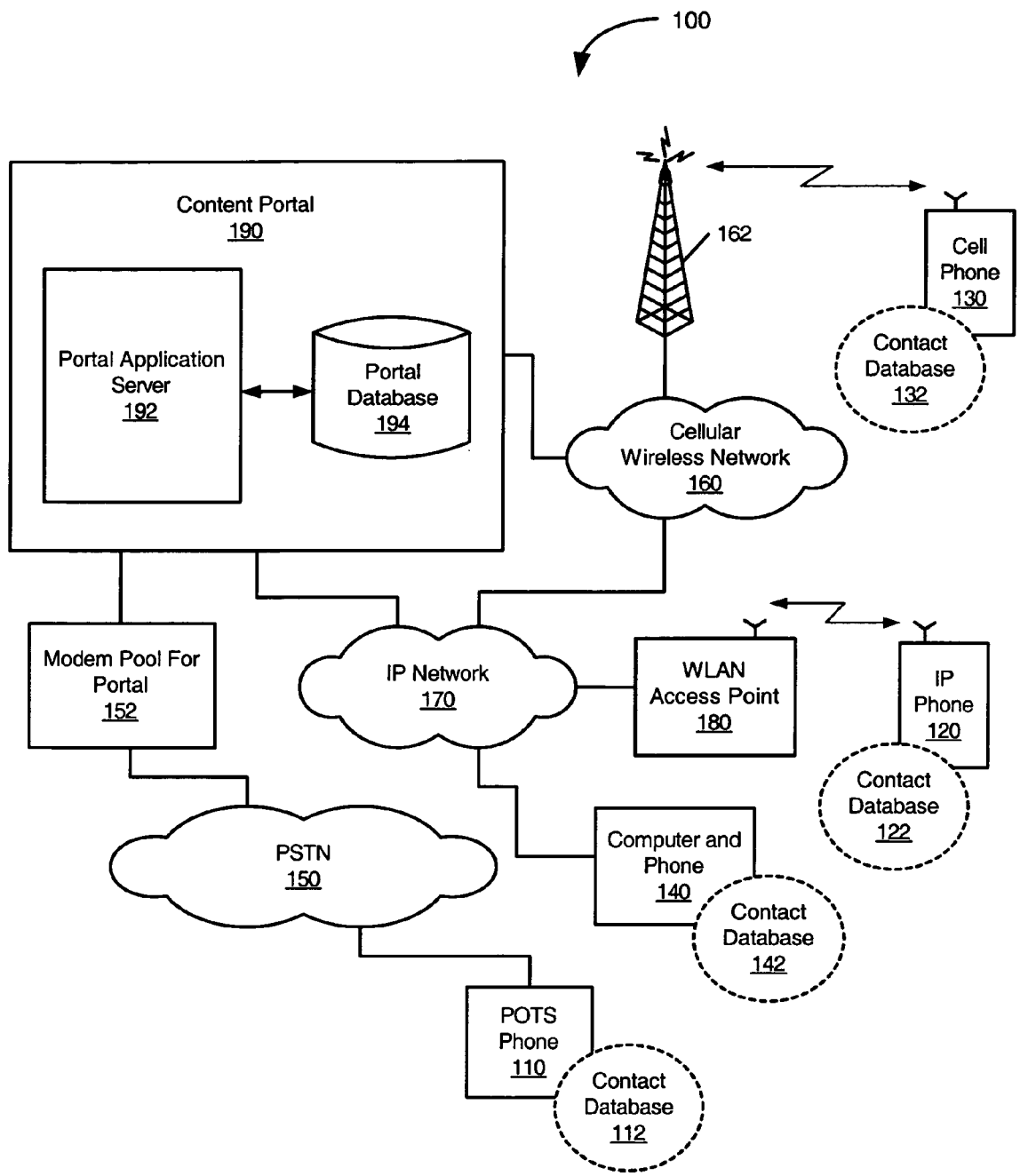
FIG. 1 is a block diagram of a communication system with a POTS phone that synchronizes its contact database with contact databases in other devices according to some embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items and may be abbreviated by "/".

Although the terms first, second, etc. may be used herein to describe various elements, these elements should not be limited by these terms. These terms are only used to distinguish one element from another element. Thus, a first device discussed below could be termed a second device without departing from the teachings of the present invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams of methods, systems, devices and computer program products according to embodiments of the invention. It will be understood that a block of the block diagrams, and combinations of blocks in the block diagrams, may be implemented at least in part by computer program instructions. These computer program instructions may be provided to a controller of a device, such that the instructions, which execute via the controller create means, modules, devices or methods for implementing the functions/acts specified in the block diagram block or blocks.

These computer program instructions may also be stored in a memory on the device that can direct a controller of a device to function in a particular manner, such that the instructions stored in the memory produce an article of manufacture including computer-readable program code which implements the functions/acts specified in block diagram block or blocks. The computer program instructions may also be loaded onto a controller of a device to cause a series of operational steps to be performed to produce a computer implemented process such that the instructions which execute on the controller provide steps for implementing the functions/acts specified in the block diagram block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of an exemplary communications system 100 that includes a POTS phone 110, an IP phone 120, a cellular phone 130, and a personal computer with a phone 140, each of which respectively includes a contact database 112, 122, 132, and 142. A user can store names and associated telephone numbers in the contact database 112 in the POTS phone 110, and later retrieve and use the stored data to establish a telephone call from the POTS phone 110. The other contact databases 122, 132, and 142 can be similarly used to store and retrieve telephone numbers associated with names for use in establishing telephone calls. Because the contact databases 112, 122, 132, and 142 are separated among the phones 110, 120, 130, and 140 respectively, a user may enter contact data into one of the databases and later want to access that same data from another one of the databases.

In accordance with some embodiments, a content portal 190 is configured to serve as a centralized repository for storing and synchronizing contact data among the phones 110, 120, 130, and 140. The content portal includes a portal application server 192 and a portal database 194. The portal application server 192 is configured to communicate with the phones 110, 120, 130, and 140 to synchronize contact data in the databases 112, 122, 132, and 142 with contact data in the portal database 194. Accordingly, the portal database 194 can serve as the centralized repository of contact data that can be compared by the portal application server 192 to contact data in each of the phones 110, 120, 130, and 140 to determine differences and to synchronize the contact data therebetween. Moreover, the portal application server 192 can communicate new and/or changed contact data in the portal database 194 to selected ones of the phone databases 112, 122, 132, and 142 so that when a user adds or changes contact data in one of the phone databases, those changes can also be reflected in the portal database 194 and in each of the other phone databases.

Although various embodiments are described herein in the context of synchronizing contact data that includes names and associated telephone numbers, it is to be understood that the invention is not limited thereto and can instead be used more broadly to synchronize any type of client application data. The client application data can include, but is not limited to, contact data, pictures, ringtones, and phone settings which may be related to selecting a ringtone for playback and/or a picture for display in response to an incoming call from a defined telephone number. Moreover, although examples of bi-directional synchronization of contact data are described between, for example, the content portal 190 and the POTS phone 150 for purposes of illustration, the term "synchronization" is used herein in a broader sense to include communication of client application in one or both directions between devices. The term POTS phone includes any device that is configured to communicate voice and client application data through dial-up connections in a PSTN.

The POTS phone 110 and the content portal 190 can establish a dial-up communication connection therebetween through the PSTN 150 and a modem pool 152 connected to the content portal 190. The modem pool 152 is configured to communicatively connect the circuit switched lines from the PSTN 150, which are associated with calls from/to POTS phones, with the content portal 190. Because the POTS phone 110 and the content portal 190 communicate with each other through the PSTN 150, one must dial a telephone number associated with the other to establish the dial-up connection therebetween.

An exemplary embodiment of the POTS phone 110 and exemplary events which can cause the POTS phone 110 to initiate a dial-up connection to the content portal 190 and to carry out synchronization of contact data therewith are now explained with reference to FIGS. 1 and 2.

Figure 2:
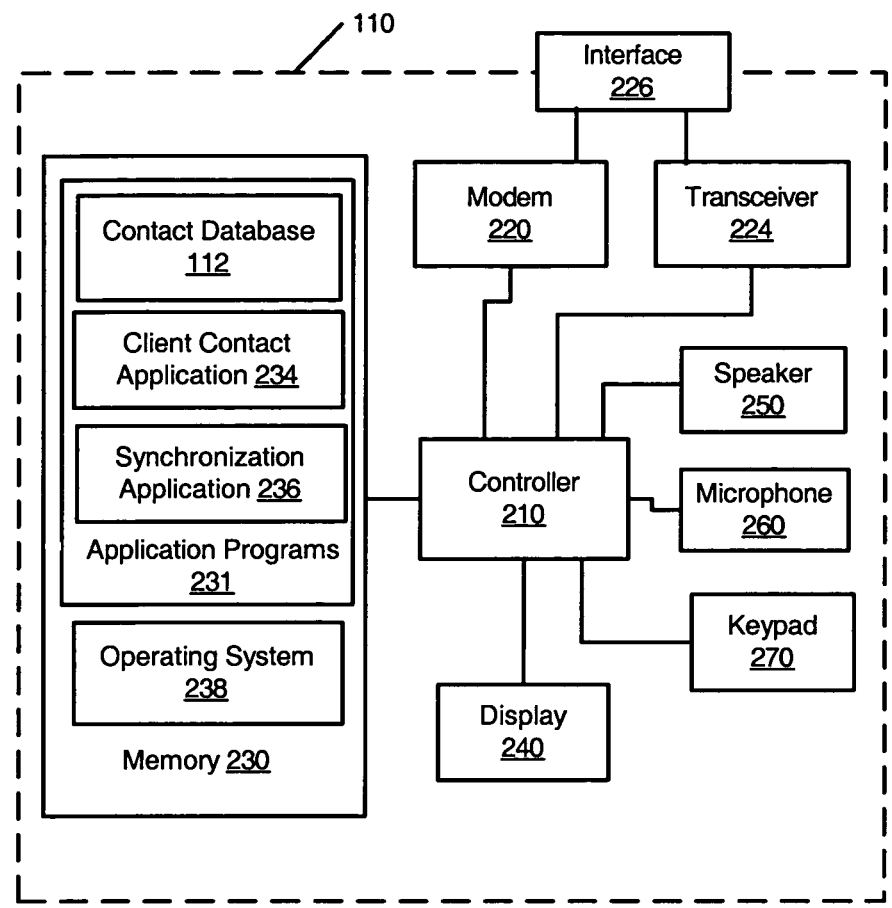
FIG. 2 is a block diagram of the POTS phone of FIG. 1 according to some embodiments of the present invention.

FIG. 2 is a block diagram of the POTS phone 110 according to some embodiments of the present invention. The POTS phone 110 can include a controller 210 that communicates with a data modem 220, a transceiver 224, a memory 230, a display 240, a speaker 250, a microphone 260, and a keypad 270 or other user input device.

The memory 230 is representative of the overall hierarchy of memory devices containing the software and data used to implement the functionality of the POTS phone 110. The memory 230 may include several categories of software and data used in the POTS phone 110, including: an operating system 238 and application programs 231. The application programs 231 are illustrative of the programs that implement the various features of the POTS phone 110 and include at least one application which supports operations as described herein. The application programs 231 can include the contact database 112, a client contact application 234, and a synchronization application 236.

The client contact application 234 may be any application that is suitable for adding, changing, and organizing contact data in the contact database 112 in a searchable format, and may include, for example, a sophisticated application that provides searchable relations or an application that simply maintains an ordered list of contacts for display in their sequence. The synchronization application 236 is configured to communicate with the content portal 190 to synchronize contact data between the contact database 112 and the portal database 194. Accordingly, the controller 210, through the application programs 231, can be configured to store, modify, search for, and display contact data, and to synchronize at least some of the contact data in the contact database 112 with the portal database 194.

A user may add contact data to a phone book defined by the database 112 through the keypad 270 and/or by selecting caller ID data received with an incoming call for inclusion into the database 112. In response to determining that contact data has been added and/or modified in the database 112, the controller 210 can initiate synchronization of the contents of the database 112 with the portal database 194, via the synchronization application 236, by retrieving a phone number associated with (assigned to) the content portal 190 from memory 230 and dialing the retrieved phone number to establish a dial-up connection with the content portal 190. Upon receiving a call from the POTS phone 110, the portal application server can determine whether the POTS phone 110 is associated with contact data in a defined portion of the portal database 194 and, when it is, can synchronize at least a portion of the databases 112 and 144, such as by incorporating at least the changed content data, or all content data, from database 112 into its database 194. The portal application server 192 may carry out authentication of the POTS phone 110 (e.g., via exchange of authentication keys) before allowing synchronization with the portal database 194.

The user may also define in the synchronization application 236 a schedule for when the POTS phone 110 is to initiate synchronization of contact data with the content portal 190. For example, the synchronization application 236 may initiate the synchronization in response to expiration of a user defined time since last synchronization, occurrence of a user defined time of day, and/or occurrence of a user defined day of week and/or month.

The data modem 220 and a transceiver 224 are connected to an interface module 226 that may be configured as a RJ-11 jack to connect to the PSTN 150 through a conventional analog telephone line. The transceiver 224 can be used during voice calls to transmit sound from the microphone 260 through a wireline and/or wireless connection to the PSTN 150 and to couple sound received from the PSTN 150 to the speaker 250. The data modem 220 can be configured to communicate contact data during synchronization with the content portal 190.

In response to synchronization, the portal application server 192 may determine whether the POTS phone 110 is associated with another phone, such as with the IP phone 120, cellular phone 130, and/or computer phone 140. The portal application server 192 may communicate with other phones based on the association determination to synchronize at least the changed contact data with databases in those phones.

A user may register the POTS phone 110 with the content portal 190 to establish a user's account that associates it with the portal database 194 and selected other phones 120, 130, and/or 140. Such registration may be provided as a subscription-based service that is offered to a user to facilitate easier cross-management of a phone book in the POTS phone 110 with phone books in the other phones 120, 130, and/or 140 via the centralized portal database 194.

By way of example, the portal application server 192 may determine that a user of the POTS phone 110 has defined that contact data in a portion of the portal database 194 is to be synchronized with contact data in the IP phone 120, the cellular phone 130, and/or the computer phone 140. The portal application server 192 can communicate with the cellular phone 130 through an IP network 170, such as the Internet, a cellular wireless network 160, and a cellular base station transceiver 160. The cellular base station transceiver 160 may communicate with the cellular phone 130 according various radio access technologies that can include, but are not limited to, Code division multiple access (CDMA), Enhanced Data rates for GSM Evolution (EDGE), General Packet Radio Service (GPRS), Global System for Mobile TeleCommunications (GSM), High-Speed Downlink Packet Access (HSDPA), High-speed Uplink Packet Access (HSUPA), Universal Mobile Telecommunications System (UMTS), Wideband Code Division Multiple Access (W-CDMA) and/or WCDMA+EDGE (WEDGE). The portal application server 192 can similarly communicate with the IP phone 120 through the IP network 170 and a Wireless Local Area Network (WLAN) access point 180, and with the computer phone 140 through the IP network 170. As also used herein, WLAN refers to various radio access technologies that can include, but are not limited to, IEEE 802.11 (a-g), Wireless Fidelity (WiFi), and Worldwide Interoperability for Microwave Access (WiMAX). The portal application server 192 can then copy at least the changed contact data from the portal database 194 to the databases 122, 132, and 142 in those devices.

According to some other embodiments, the portal application server 192 is configured to initiate synchronization between the portal database 194 and the database 112 of the POTS phone 110. The portal application server 192 may initiate synchronization in response to addition and/or change of contact data in the portal database 194. For example, a user of the IP phone 120, the cellular phone 130, and/or the computer phone 140 can initiate synchronization of contact data in those phones with the portal database 194. In response to contact data being added and/or changed in the portal database 194, the portal application server 192 can determine whether the changed data is associated with the POTS phone 110 and, when it is, the portal application server 192 can dial a telephone number associated with the POTS phone 110, establish a dial-up connection therewith, and initiate synchronization with the POTS phone 110 to communicate at least the changed contact data from the portal database 194 to the database 112.

Although FIGS. 1 and 2 illustrate an exemplary communication system 100 and POTS phone 110, it will be understood that the present invention is not limited to the illustrated configurations, but is intended instead to encompass any configuration capable of carrying out the operations described herein.

Figure 3:
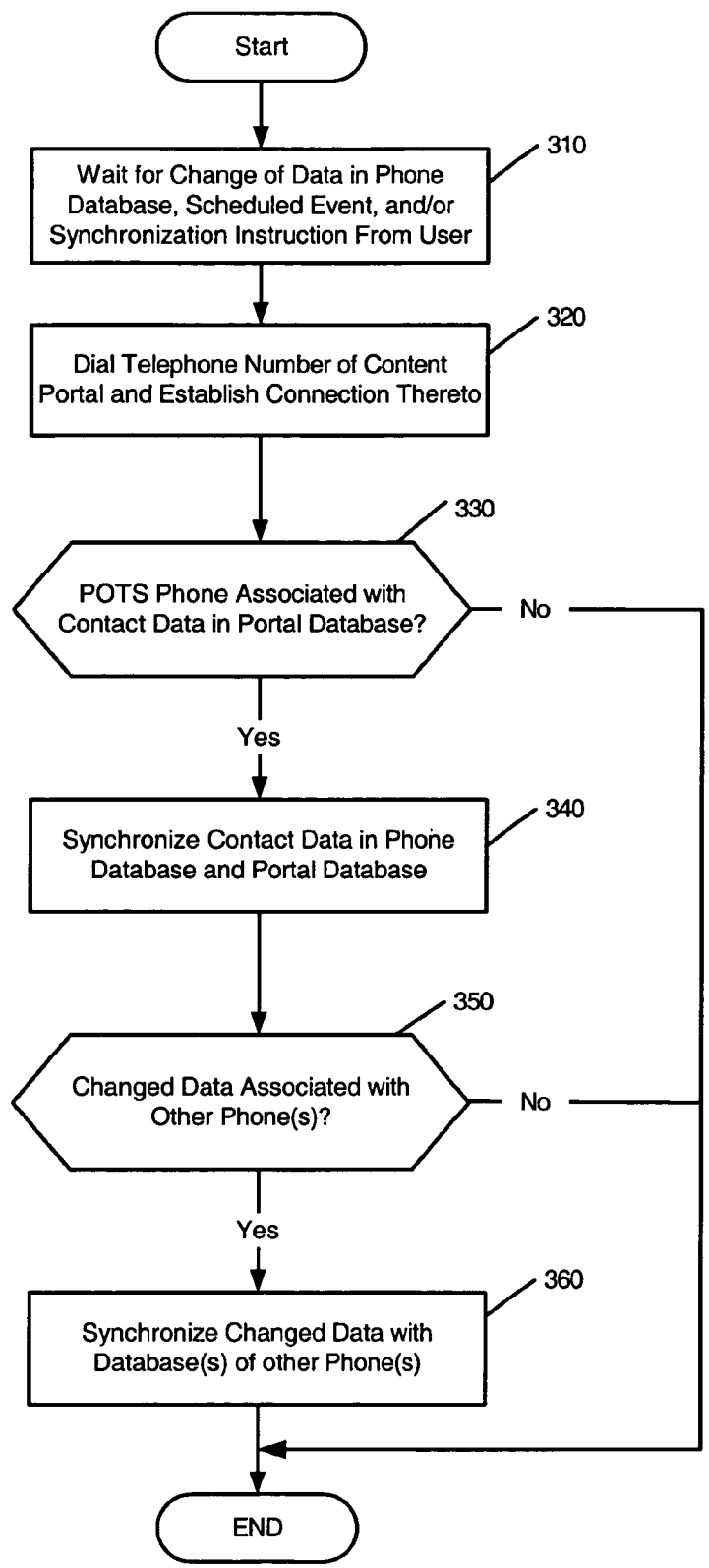
FIG. 3 is a flow chart illustrating methods and operations that carry out synchronization initiated by the POTS phone with the content portal of FIG. 1.

FIG. 3 is a flow chart illustrating exemplary methods and operations that carry out synchronization initiated by the POTS phone 110 of contact data or other client application data between the database 112 and portal database 194. In response to a change of contact data in database 112, occurrence of a scheduled event, and/or a synchronization instruction from a user (Block 310), the POTS phone 110 dials (Block 320) a telephone number of the content portal 190 to establish a communication connection thereto. A decision is made (Block 330) as to whether the POTS phone 110 is associated with contact data in a defined portion of the portal database and, when it is, synchronization of contact data is carried out (Block 340) between the database 112 and portal database 194. A decision is made (Block 350) as to whether data that has been changed in the portal database 194 is associated with other phone(s) and, when it is, synchronization of contact data is carried out (Block 360) between the database 194 and the databases of the other phone(s) (e.g., phones 120, 130, and/or 140).

Figure 4:
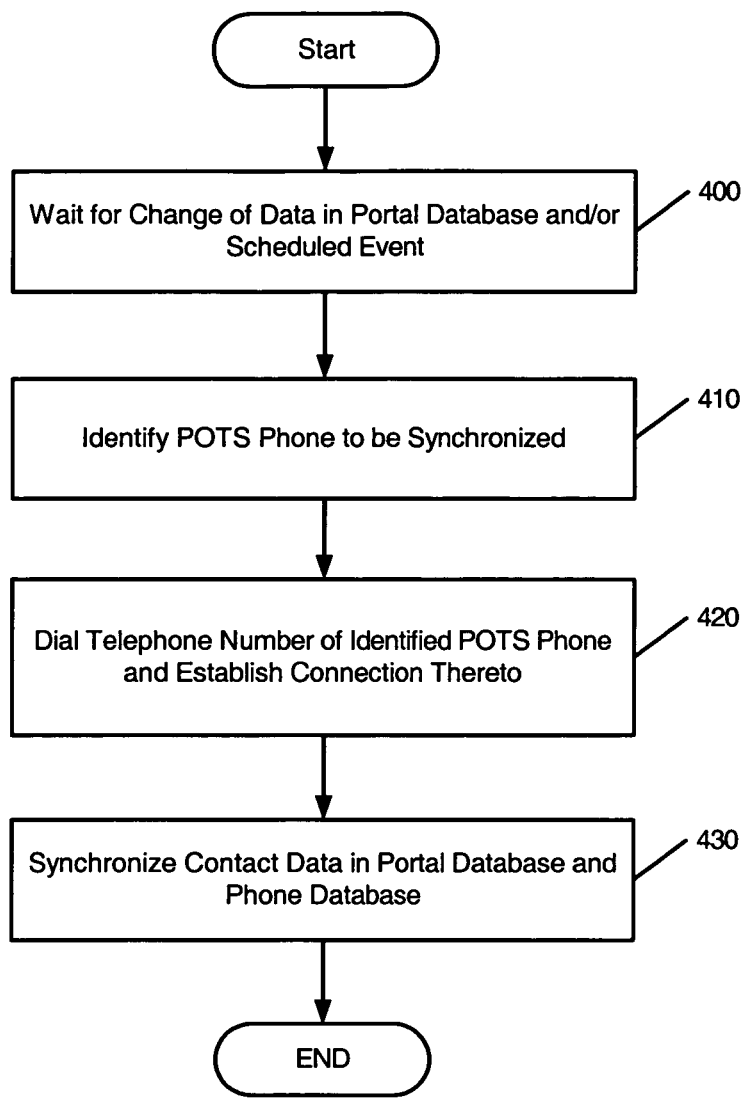
FIG. 4 is a flow chart illustrating methods and operations that carry out synchronization initiated by the portal database with the POTS phone of FIG. 1.

FIG. 4 is a flow chart illustrating exemplary methods and operations that carry out synchronization initiated by the content portal 190 of contact data or other client application data between the portal database 194 and the phone's contact database 112. In response to a change of contact data in portal database 194 and/or occurrence of a scheduled event (Block 400), the content portal 190 identifies (Block 410) that synchronization is to be carried out with the POTS phone 110. The content portal 190 dials (Block 420) a telephone number of the POTS phone 110 to establish a communication connection thereto. Synchronization of contact data is carried out (Block 440) between the portal database 194 and phone database 112.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for synchronizing multiple devices, comprising:
registering the multiple devices as being associated with each other responsive to user input at a content portal;
receiving application data that have changed from a first one of the devices at the content portal;
determining at the content portal that the first one of the devices is associated with a second one of the devices;
initiating communication at the content portal with the second one of the devices; and
communicating the application data that have changed from the content portal to the second one of the devices so as to synchronize the application data that have changed between the first and the second one of the devices;
wherein the first one of the devices is a plain old telephone system phone comprising a modem; and
wherein receiving the application data comprises receiving the application data that have changed that have been transmitted by the modem over a dial-up communication connection established between the plain old telephone system phone and the content portal through a public switched telephone network;
wherein the method further comprises:
programmatically determining at the content portal that the plain old telephone system phone is associated with client application data in a portal database of the content portal;
wherein programmatically determining at the content portal that the plain old telephone system phone is associated with the client application data comprises:
programmatically determining at the content portal that at least some of the client application data in the portal database has changed;
determining at the content portal that the changed client application data is associated with the plain old telephone system phone; and
programmatically dialing from the content portal a telephone number associated with the plain old telephone system phone in response to the at least some of the client application data that has changed in the portal database; and
wherein the method further comprises:
programmatically synchronizing the client application data between the plain old telephone system phone and the portal database comprising communicating the client application data in the portal database that has changed to the plain old telephone system phone through the public switched telephone network over the dial-up communication connection.

2. The method of claim 1, wherein the application data that have changed comprise one of contact data, picture data, ringtone data, and phone setting data.

3. The method of claim 1, wherein the second one of the devices is a plain old telephone system phone.

4. The method of claim 1, wherein the second one of the devices is a cellular phone.

5. The method of claim 1, wherein the second one of the devices is an Internet protocol phone.

6. A system for synchronizing multiple devices, comprising:
a controller;
a memory coupled to the controller and comprising computer readable program instructions that when executed by the controller causes the controller to perform operations comprising:
registering the multiple devices as being associated with each other responsive to user input at a content portal;
receiving application data that have changed from a first one of the devices at the content portal;
determining at the content portal that the first one of the devices is associated with a second one of the devices;
initiating communication at the content portal with the second one of the devices; and
communicating the application data that have changed from the content portal to the second one of the devices so as to synchronize the application data that have changed between the first and the second one of the devices;
wherein the first one of the devices is a plain old telephone system phone comprising a modem; and
wherein receiving the application data comprises receiving the application data that have changed that have been transmitted by the modem over a dial-up communication connection established between the plain old telephone system phone and the content portal through a public switched telephone network;
wherein the operations further comprise:
programmatically determining at the content portal that the plain old telephone system phone is associated with client application data in a portal database of the content portal;
wherein programmatically determining at the content portal that the plain old telephone system phone is associated with the client application data comprises:
programmatically determining at the content portal that at least some of the client application data in the portal database has changed;
determining at the content portal that the changed client application data is associated with the plain old telephone system phone; and
programmatically dialing from the content portal a telephone number associated with the plain old telephone system phone in response to the at least some of the client application data that has changed in the portal database; and
wherein the operations further comprise:
programmatically synchronizing the client application data between the plain old telephone system phone and the portal database comprising communicating the client application data in the portal database that has changed to the plain old telephone system phone through the public switched telephone network over the dial-up communication connection.

7. The system of claim 6, wherein the second one of the devices is a plain old telephone system phone.

8. The system of claim 6, wherein the second one of the devices is a cellular phone.

9. The system of claim 6, wherein the second one of the devices is an Internet protocol phone.

10. A computer program product for synchronizing multiple devices, comprising:
a non-transitory computer readable medium comprising computer readable program instructions that when executed by a controller causes the controller to perform operations comprising:
registering the multiple devices as being associated with each other responsive to user input at a content portal;
receiving application data that have changed from a first one of the devices at the content portal;
determining at the content portal that the first one of the devices is associated with a second one of the devices;

initiating communication at the content portal with the second one of the devices; and communicating the application data that have changed from the content portal to the second one of the devices so as to synchronize the application data that have changed between the first and the second one of the devices;

wherein the first one of the devices is a plain old telephone system phone comprising a modem; and wherein receiving the application data comprises receiving the application data that have changed that have been transmitted by the modem over a dial-up communication connection established between the plain old telephone system phone and the content portal through a public switched telephone network;

wherein the operations further comprise:

programmatically determining at the content portal that the plain old telephone system phone is associated with client application data in a portal database of the content portal;

wherein programmatically determining at the content portal that the plain old telephone system phone is associated with the client application data comprises:

programmatically determining at the content portal that at least some of the client application data in the portal database has changed;

determining at the content portal that the changed client application data is associated with the plain old telephone system phone; and programmatically dialing from the content portal a telephone number associated with the plain old telephone system phone in response to the at least some of the client application data that has changed in the portal database; and wherein the operations further comprise:

programmatically synchronizing the client application data between the plain old telephone system phone and the portal database comprising communicating the client application data in the portal database that has changed to the plain old telephone system phone through the public switched telephone network over the dial-up communication connection.

11. The system of claim 6, wherein the application data that have changed comprise one of contact data, picture data, ringtone data, and phone setting data.

12. The computer program product of claim 10, wherein the application data that have changed comprise one of contact data, picture data, ringtone data, and phone setting data.

13. The computer program product of claim 10, wherein the second one of the devices is a plain old telephone system phone.

14. The computer program product of claim 10, wherein the second one of the devices is a cellular phone.

15. The computer program product of claim 10, wherein the second one of the devices is an Internet protocol phone.

* * * * *